United States Patent [19]

Urech et al.

[11] 4,366,108

[45] Dec. 28, 1982

[54] LIQUID MATRIX SYSTEM BASED ON A MIXTURE OF EPOXIDE RESIN AND AN AMINE CURING AGENT FOR PRODUCING FIBRE-REINFORCED PLASTICS COMPONENTS

[75] Inventors: Karl Urech, Pratteln; Jürgen Habermeier, Pfeffingen; Roland Moser, Basel, all of Switzerland

[73] Assignee: Ciba-Geigy Corporation, Ardsley, N.Y.

[21] Appl. No.: 283,766

[22] Filed: Jul. 16, 1981

[30] Foreign Application Priority Data

Jul. 25, 1980 [CH] Switzerland .......................... 5707/80

[51] Int. Cl.$^3$ ............................................. C08G 59/50
[52] U.S. Cl. ..................................... 264/137; 264/236; 264/347; 525/423; 523/400; 523/468; 528/91; 528/99; 528/103; 528/124; 528/407
[58] Field of Search ............. 260/37 EP; 528/91, 103, 528/124, 407, 99; 525/423; 523/400, 468; 264/137, 236, 347

[56] References Cited

U.S. PATENT DOCUMENTS 3,793,247 2/1974 Fleming et al. ................. 528/91 X

FOREIGN PATENT DOCUMENTS 1034790 7/1966 United Kingdom .

OTHER PUBLICATIONS

Lee et al., Handbook of Epoxy Resins, pp. 11-11.

*Primary Examiner*—Earl A. Nielsen
*Attorney, Agent, or Firm*—Harry Falber

[57] ABSTRACT

Liquid polyglycidyl compounds, diethyltoluylenediamine, a curing accelerator and optionally further additives form a liquid matrix system with which fibres and fibre shapes are impregnated by known techniques, particularly by filament winding, pultrusion and injection processes. The components thus produced are for example tubes capable of withstanding pressure and torsional stress.

7 Claims, No Drawings

LIQUID MATRIX SYSTEM BASED ON A MIXTURE OF EPOXIDE RESIN AND AN AMINE CURING AGENT FOR PRODUCING FIBRE-REINFORCED PLASTICS COMPONENTS

Epoxide resin/curing agent systems which can be used for producing fibre-reinforced plastics, such as laminates, are known. It is of advantage for impregnating the fibres when these systems are liquid and of low viscosity, and for this reason the systems contain liquid acid anhydrides as curing agents. After prolonged contact with water, cured composites produced from a system of this type commence to decompose as a result of hydrolysis, a disadvantage which, as is known, epoxide resin systems with aromatic amine curing agents do not have. Systems of this kind, however, are solid and/or cure only at very high temperatures. The curing temperature can indeed be lowered by the addition of accelerators, but there is a simultaneous shortening of the pot life, so that such systems are not suitable for carrying out filament winding or pultrusion on an industrial scale.

It was therefore not to be expected that an epoxide resin system having a content of a specific curing agent together with a curing accelerator would constitute an excellent matrix system for fibre-reinforced plastics, a system which would simultaneously have the advantages of the resin/acid anhydride curing agent systems, particularly with regard to processing, and of the resin/amine curing agent systems in respect of the properties of the final products, without having the disadvantages associated with the two systems. There has long been a great need for the type of system provided by the present invention.

The invention relates therefore to a liquid matrix system, based on a mixture of epoxide resin and an amine curing agent for the epoxide resin, for producing fibre-reinforced plastics components, which system is characterised in that it has at 40° C. a dynamic viscosity of less than 400 mPa s, preferably less than 250 mPa s, and contains (a) a liquid diglycidyl ether of bisphenol-F or a mixture of liquid polyglycidyl compounds, (b) diethyltoluylenediamine as curing agent for the glycidyl compound, (c) a curing accelerator, and (d) optionally additives, wherein to one epoxide group of the component (a) there are 0.8–1.2 aminohydrogen atoms, preferably 1 aminohydrogen atom, of the component (b), and wherein 94–99.7 percent by weight of the component (b) and 0.3–6 percent by weight of the component (c), relative to the amount of (b) and (c), are present.

Polyglycidyl compounds (a) are preferably those based on bisphenol-F or on bisphenol-A, or based on phenolnovolaks, or on mixtures thereof in any mixture ratio. They can be mixed with a polyglycide of an alkanediol, such as butanediol diglycide, preferably in an amount of 3–5 percent by weight, relative to the total amount of the polyglycidyl compounds, or with an aromatic compound having amino and hydroxyl groups, such as diglycidyl-p-aminophenol, preferably in an amount of 3–20 percent by weight, relative to the total amount of polyglycidyl compounds. Further preferred polyglycidyl compounds are triglycidyl-p-aminophenol and tetraglycidyl-p,p'-diaminodiphenylmethane, which can be mixed with butanediol diglycide or triglycidyl-p-aminophenol. The compounds mentioned can also be used in any admixtures with one another or with hydantoin diglycidyl compounds, such as N,N'-diglycidyl-5,5-dimethylhydantoin, provided that the viscosity of the final mixture at 40° C. is less then 400 mPa s.

The accelerator (c) is advantageously mixed with diethyltoluylenediamine (mostly 1-methyl-3,5-diethyl-2,4-diaminobenzene, but also 1-methyl-3,5-diethyl-2,6-diaminobenzene) in a quantitative ratio within the stated range. Suitable accelerators are tertiary amines, for example 1-methyl-imidazole, or phenols, such as salicylic acid, especially however borofluoroamine complexes of organic compounds, such as $BF_2$-acetoacetanilide, $BF_3$-aniline complexes or $BF_3$-monoethylamine.

To the mixture of the components (b) and (c) can be added, as additives, p,p'-diamino-diphenylmethane or mixtures of these compounds with homologues thereof, such as 3-ethyl-4,4'-diamino-diphenylmethane and/or 3,3'-diethyl-4,4'-diamino-diphenylmethane, the component (b) having at all events to be present to the extent of at least 50 percent by weight in the mixture (b)+(c)+(d).

The matrix system according to the invention is preferably applied without solvent. It can however contain, relative to the total weight of the matrix system, up to 20% of an inert solvent, such as toluene, also up to 20% of a reactive vinyl or acrylic polymer with the corresponding radical initiators, up to 5% of an adhesion promoter and up to 2% of a dye.

The matrix system according to the invention preferably contains a mixture of diglycidyl ether of bisphenol-F and bisphenol-A, the epoxide content being 5.3–6.1 val/kg, and, relative to the total amount of glycidyl compounds, 3–15 percent by weight of diglycidyloxybutane or 3–20 percent by weight of triglycidyl-p-aminophenol, as well as (b) a mixture of 95–98 percent by weight of diethyltoluylenediamine and 2–5 percent by weight of $BF_2$-acetoacetanilide. This mixture preferably has at 40° C. a dynamic viscosity of less than 250 mPa s.

Particularly preferred is a matrix system which contains as component (a) a mixture of 65 percent by weight of diglycidyl ether of bisphenol-F (epoxide content: 5.8–6.1 val/kg), 30 percent by weight of diglycidyl ether of bisphenol-A (epoxide content: 5.3–6.7 val/kg) and 5 percent by weight of diglycidyloxybutane (epoxide content: 8.5–9.5 val/kg), and, as components (b) and (c), a mixture of 96 percent by weight of diethyltoluylenediamine and 4 percent by weight of difluoroboroacetoacetanilide.

The matrix according to the invention is used to produce fibre-reinforced plastics. It is thus possible, using known impregnating methods, to impregnate and cure fibre materials such as filaments, rovings, mats or fabrics. Advantageous factors in the procedure are the low viscosity at the working temperatures (at 40°–60° C.), the long pot life and the short gelling and curing times. The cured components have good mechanical strengths, high glass transition temperatures and very high thermal stability. Furthermore, their stability in water and resistance to chemicals, particularly at elevated temperatures and after prolonged periods of time, are better than in the case of resin/anhydride curing agent systems, which likewise are systems having low viscosity.

The matrix of the invention is suitable for producing prepegs, especially where the operations are performed without solvents, and for use in the pultrusion process, in which the procedure can be carried out with or without solvents; in addition, the matrix is particularly advantageous in those technical fields of operation where solvents have to be avoided, such as in the case of injection moulding or in particular filament winding for producing high-strength, thermally and chemically resistant structural components in large-scale series production.

The matrix according to the invention can be employed for example for manufacturing hollow objects, for instance tubes capable of withstanding pressure and torsional stress, such as tubes for universal-joint shafts, stabilisers and axles, and also for producing fibre-reinforced solid materials, for example spring elements.

The process for producing fibre-reinforced plastics components, which process comprises using the matrix system for impregnating fibre material, forming shaped articles by filament winding or pultrusion and subsequently heating the shaped components at 100°–180° C., especially at 100°–140° C., is likewise subject matter of the present invention.

Suitable fibre materials are preferably glass fibres, for example those formed from E- or S-glass, aramid fibres, high-modulus and high-strength carbon fibres made from polyacrylonitrile or pitch, and also polyester and polyamide fibres. The content of fibre material in the cured final product varies depending on the method of production and on the nature of the fibres, for example in a product formed by filament winding the content is between 45 and 75 percent by volume.

By filament winding (precision winding) is meant an operation whereby prestretched, parallel running fibres, impregnated in a resin/curing agent system, are wound round a mandrel, the fibres being located according to a precisely predetermined geometrical pattern. The pultrusion process has similar features. In this case, however, the impregnated rovings are shaped by being pulled through a heated dye and pre-cured to the extent that subsequent curing in a through-type oven can no longer lead to deformation or delamination.

EXAMPLE 1

65 parts by weight of diglycidyl ether of bisphenol-F (epoxide content: 6.0 val/kg [val/kg=gram equivalent/kg]), 30 parts by weight of diglycidyl ether of bisphenol-A (epoxide content: 5.45 val/kg) and 5 parts by weight of 1,4-butanediol-diglycidyl ether (epoxide content: 9.2 val/kg) are stirred up until the mixture is homogeneous. Into this are then stirred 25 parts by weight of a mixture of 96 parts by weight of 1-methyl-3,5-diethyl-2,4-diaminobenzene and 4 parts by weight of $BF_2$-acetoacetanilide. A matrix system having a dynamic viscosity of 220 mPa s at 40° C. is thus obtained. A specimen of 1 g gels at 80° C. in 4½ hours, and at 140° C. in 13 minutes. The product has a glass transition temperature ($T_G$) of 168° C. after curing for 8 hours at 140° C., and a $T_G$ of 169° C. after curing for 4 hours at 180° C.

Cold-water absorption at 23° C. according to ISO R 62 after 4 days is 0.22% and after 10 days 0.34%. Boiling-water absorption according to ISO R 117 after 30 minutes is 0.08% and after 60 minutes 0.2%.

The matrix system is used for impregnating fibres made from glass, carbon and aramid, from which are produced, by the filament winding process, unidirectional specimens which are subjected, according to W. Knappe and W. Schneider: "Rupture criteria for unidirectional glass-fibre plastics under plane short- and long-duration stressing" in Kunststoffe (Plastics) 62, No. 12, 1972, to the tensile, compression and torsion tests.

The following results are obtained at 23° C. after a curing time of 8 hours at 140° C.:

| Mechanical strength according to ISO R 527 | Glass fibres ("Cosmostrand 859 × 29/890"; OCF) | Carbon fibres ("P 55 S"; UCC) | Aramid fibres ("Kevlar 49"; Du Pont) |
|---|---|---|---|
| Fibre content | 59% v/v | 58% v/v | 62% v/v |
| tensile strength $N/mm^2$ | 44.6 | 20.1 | 20.1 |
| elongation | 0.36% | 0.35% | 0.42% |
| elastic modulus $N/mm^2$ | 13941 | 5956 | 4821 |

EXAMPLE 2

75 parts by weight of polyglycidyl ether of epoxyphenol novolak (epoxide content: 5.7 val/kg) and 25 parts by weight of 1,4-butanediol-diglycidyl ether (epoxide content: 9.2 val/kg) are homogeneously mixed together. Into the mixture are stirred 30 parts by weight of a mixture of 83 parts by weight of 1-methyl-3,5-diethyl-2,4-diaminobenzene and 13 parts by weight of p,p'-diamino-diphenylmethane and 4 parts by weight of $BF_2$-acetoacetanilide. A matrix system having a dynamic viscosity of 300 mPa s at 40° C. is thus obtained. A 1 g specimen gels at 140° C. in 6 minutes. After curing for 8 hours at 140° C., the product has a glass transition temperature ($T_G$) of 155° C.; and the boiling-water absorption according to ISO R 117 after 1 hour is 0.16%. The tensile strength determined perpendicularly to the fibres on wound objects reinforced unidirectionally with 65% v/v of glass fibres "Cosmostrand 859×29/890" ® is 54 $N/mm^2$.

EXAMPLE 3

70 parts by weight of a viscous epoxide resin having an epoxide content of 8 val/kg, produced from 33 parts by weight of di-(p-aminophenyl)-methane and 67 parts by weight of epichlorohydrin, are homogeneously stirred up with 30 parts by weight of 1,4-butanediol-glycidyl ether (epoxide content: 9.2 val/kg). To this mixture are added 38 parts by weight of a mixture of 36.48 parts by weight of 1-methyl-3,5-diethyl-2,4-diaminobenzene and 1.52 parts by weight of $BF_2$-acetoacetanilide.

The matrix system obtained has at 50° C. a dynamic viscosity of 193 mPa s. A 1 g specimen gels at 140° C. after 17 minutes. The product has a $T_G$ of 178° C. after a curing time of 8 hours at 140° C. The boiling-water absorption, according to ISO R 117, after 1 hour is 0.24%.

What is claimed is:

1. A liquid matrix system based on a mixture of epoxide resin and an amine curing agent for producing fibre-reinforced plastics components, which system is characterised in that it has at 40° C. a dynamic viscosity of less than 400 mPa s, and contains
   (a) a liquid diglycidyl ether of bisphenol-F or a mixture of liquid polyglycidyl compounds,
   (b) diethyltoluylenediamine as curing agent for the glycidyl compound,
   (c) $BF_2$-acetoacetanilide as a curing accelerator, and
   (d) optionally additives, wherein to one epoxide group of the component (a) there are 0.8–1.2 aminohydrogen atoms of the component (b), and wherein 94–99.7 percent by weight of the component (b) and 0.3–6 percent by weight of the component (c), relative to the amount of (b) and (c), are present.

2. A matrix system according to claim 1, which contains no solvent.

3. A matrix system according to claim 1, which has a dynamic viscosity of less than 250 mPa s.

4. A matrix system according to claim 1, which contains a mixture of diglycidyl ether of bisphenol-F and bisphenol A, the epoxide content being 5.3–6.1 val/kg, and, relative to the total amount of component (a), additionally 3–15 percent by weight of an alkanediol-diglycidyl ether or 3–20 percent by weight of a polyglycidylated aromatic compound having amino and hydroxyl groups.

5. A matrix system according to claim 1, which contains the component (b) in an amount of 95–98 percent by weight, and the component (c) in an amount of 2–5 percent by weight, the percentage values being relative to the total amount of components (b) and (c).

6. A process for producing fibre-reinforcing plastics components, which process comprises using the matrix system according to claim 1 for impregnating fibre material, forming shaped articles by filament winding or by pultrusion and subsequently heating the shaped components at 100°–180° C.

7. A process according to claim 6, wherein glass fibres, carbon fibres or aramid fibres are impregnated and shaped.

* * * * *